F. V. D. LONGACRE.
STARTING MEANS FOR MOTOR DRIVEN COMPRESSOR INSTALLATIONS.
APPLICATION FILED APR. 23, 1919.
1,347,786.
Patented July 27, 1920.
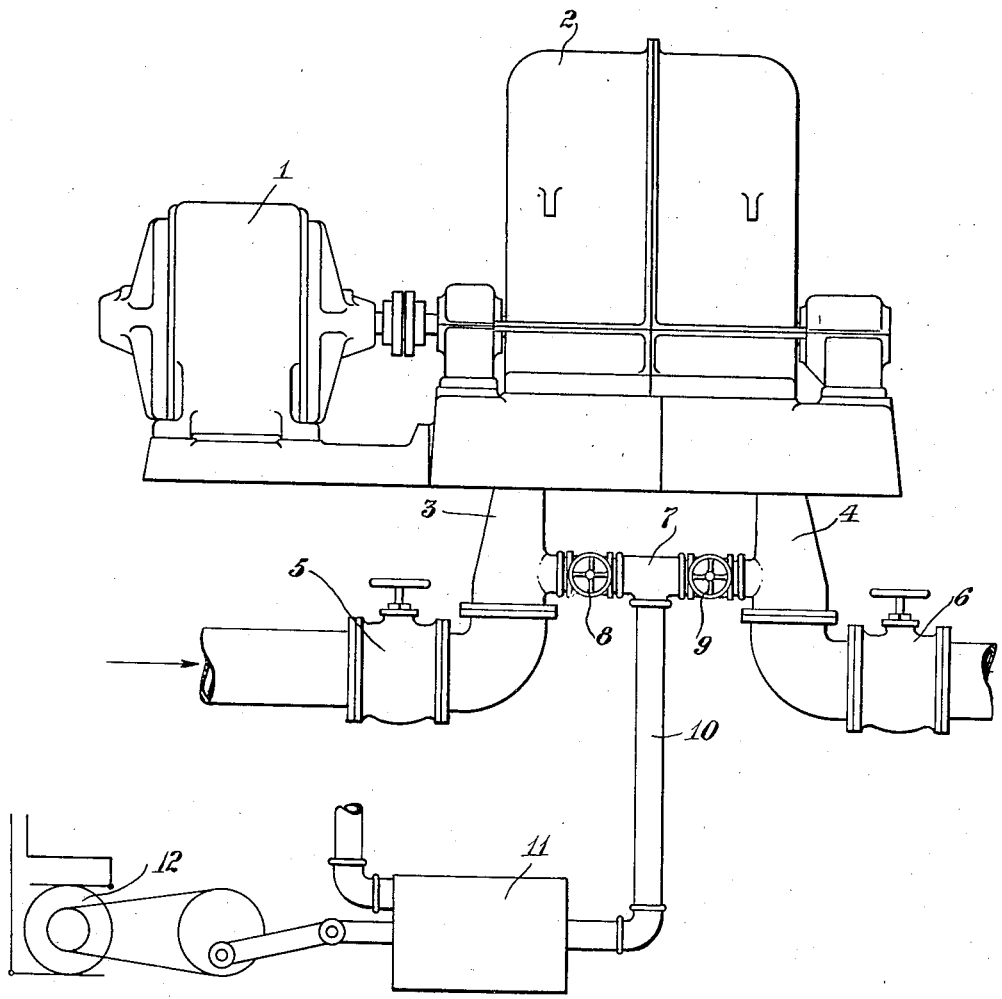

UNITED STATES PATENT OFFICE.

FREDERICK V. D. LONGACRE, OF YONKERS, NEW YORK, ASSIGNOR TO INGERSOLL-RAND COMPANY, OF JERSEY CITY, NEW JERSEY, A CORPORATION OF NEW JERSEY.

STARTING MEANS FOR MOTOR-DRIVEN COMPRESSOR INSTALLATIONS.

1,347,786.    Specification of Letters Patent.    Patented July 27, 1920.

Application filed April 23, 1919. Serial No. 292,017.

*To all whom it may concern:*

Be it known that I, FREDERICK V. D. LONGACRE, a citizen of the United States, residing at Yonkers, in the county of Westchester and State of New York, have invented a certain new and useful Improvement in Starting Means for Motor-Driven Compressor Installations, of which the following is a specification.

This invention relates to blower or compressor units used to compress air and other gases and especially to those adapted to be driven by an electric motor. The invention in particular relates to means for starting the compressor in an installation adapted to operate at extremely high speeds and operated by a synchronous motor directly connected to the compressor or blower.

In turbo blowers or centrifugal compressors of large size which are for the most part operated by electric motors of synchronous type a difficulty is encountered in starting. This is due to the fact that a synchronous motor has a very low starting torque of its own, sometimes additional starting torque being obtained by including some induction windings so that it may start as an induction motor. Even when induction windings are included the starting torque is low and unless some means are provided to partially or nearly completely unload the blower or compressor, it will fail to start, due to the low torque developed by motor. Even synchronous motors used in this work when provided with the special induction windings above referred to, which add greatly to the expense of the motor, have a limited torque, and, until they are brought up to speed when they can be changed over from an induction type to a synchronous type are greatly limited in ability to start and accelerate the speed up to synchronous speed. Furthermore, in motors of this type, to provide sufficient starting torque to bring a directly connected compressor up to speed, and to prevent a sudden and heavy load being thrown on the motor at the instant it is changed over from an induction to a synchronous motor, requires expensive and complicated mechanical and electrical additions to the windings of the rotor of the motor.

It is therefore an object of the present invention to provide means by which the blower or compressor may be unloaded as completely as possible to permit starting on low torque and consequent reduction in starting current which can be furnished by the use of a less expensive and simple motor, and for this purpose it is contemplated to exhaust the air or other gas from the blower or compressor casing to as high a vacuum as possible so that the resistance due to windage and friction may be reduced as far as possible.

With these and other objects in view my invention consists in the features of construction and operation set forth in the following specification.

In the drawing annexed hereto and forming a part of this specification, the figure shows diagrammatically a motor driven blower or compressor with means for exhausting the air from the impeller casing.

Referring more particularly to the figure of the drawing, the motor which is usually, as above stated, of the synchronous type having some induction windings is shown at 1 and directly connected thereto is the blower or compressor 2. The intake of blower 2 is shown at 3 and the discharge outlet at 4.

Located in intake 3 and discharge outlet 4 are shut off valves respectively shown at 5 and 6 by means of which one or both of these conduits may be completely closed. Connecting the inlet and discharge conduits 3 and 4 between the blower casing 2 and the valves 5 and 6 is a connecting conduit 7 which may be provided with valves 8 and 9 near either end, and between the valves 8 and 9 is a conduit 10 to which a vacuum pump 11 is connected. This vacuum pump 11 may be driven by any suitable means, the means shown comprising an electric motor 12.

In applying the present invention to start the blower 2 under conditions of the very lowest friction load, wind resistance, etc., it is contemplated to completely exhaust the impeller chamber within the blower 2 of air or other gas being compressed. In order to accomplish this, valves 5 and 6 are closed tightly and one or both of valves 8 and 9 opened. The vacuum pump is then started which serves to completely exhaust the air or other gas from the impeller chamber and intake and discharge conduits 3 and 4. When this has been accomplished the motor 1 may be readily started which even with its very slight starting torque will enable the impeller to be brought up to synchronous speed.

As soon as the blower or compressor 2 has been brought up to nearly synchronous operation, valves 5 and 6 may be opened and valve 9 closed after which the installation will operate in the usual or customary manner.

It is to be understood that the present showing and description disclose only one specific embodiment of my present invention, and that other forms and modifications are included within the spirit and scope thereof, as expressed in the appended claims.

I claim:

1. The combination of a synchronous motor, a centrifugal compressor coupled directly thereto, and independent means for producing and maintaining a vacuum throughout the interior of said centrifugal compressor until said synchronous motor has been brought up to speed.

2. The combination of a motor driven centrifugal blower having intake and discharge conduits and valves for closing the same, independent means connected to at least one of said conduits for producing a vacuum in said blower when the conduit controlling valves are closed, and a valve for closing the connection leading to the vacuum producing means.

3. The combination of a centrifugal compressor, a direct connected synchronous motor for driving the centrifugal compressor, intake and discharge conduits and valves for closing the same, means independent of the compressor and motor connected to at least one of said conduits for producing a vacuum in said compressor when the conduit controlling valves are closed, and a valve for closing the connection leading to the vacuum producing means.

In testimony whereof I have hereunto set my hand.

FREDERICK v. D. LONGACRE.